United States Patent Office 3,555,083
Patented Jan. 12, 1971

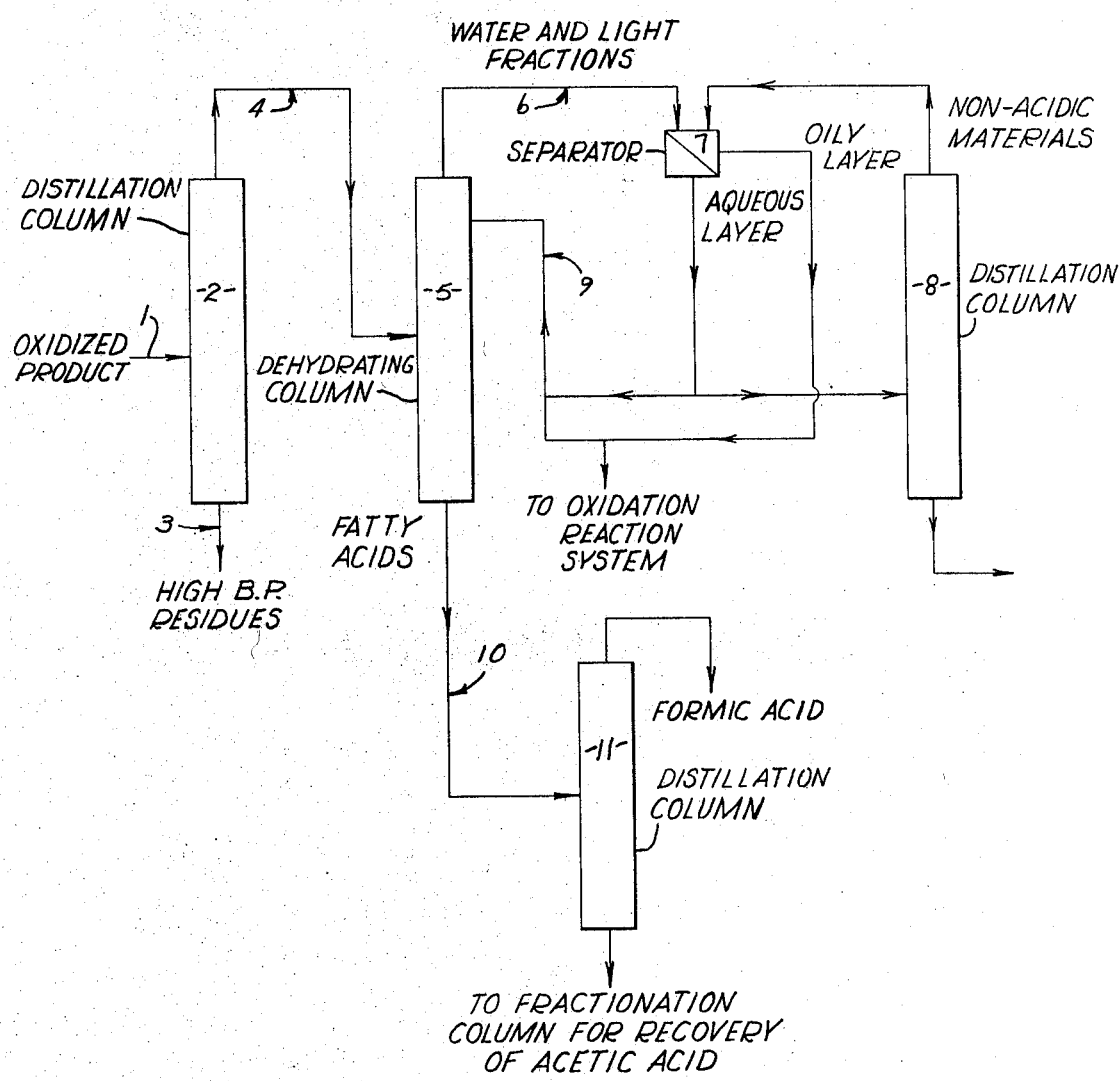

3,555,083
PROCESS FOR THE PURIFICATION OF LOWER FATTY ACIDS
Takeo Nakamura, Musashino-shi, Hiroshi Murayama, Meguro-ku, and Tatsuya Yamaguchi, Tokyo, Japan, assignors to Tekkosha Co. Ltd., Tokyo, Japan, a corporation of Japan
Filed Mar. 12, 1964, Ser. No. 351,334
Int. Cl. C07c 51/22
U.S. Cl. 260—533                                                6 Claims

ABSTRACT OF THE DISCLOSURE

A process for recovering lower fatty acids, such as formic acid and acetic acid, from the oxidized products obtained by oxidizing, in the liquid phase, paraffinic hydrocarbons, naphthenic hydrocarbons and mixtures thereof, said hydrocarbons having boiling points lower than 200° C., with molecular oxygen or an oxygen-containing gas, in which the light fractions obtained from the oxidized products made by the liquid phase oxidation of the above-mentioned hydrocarbons are recycled to the distillation apparatus to serve as entrainers for water in the dehydrating distillation of azeotropic mixtures of water and lower fatty acids having 1–4 carbons atoms.

---

This invention relates to a novel and improved purification process for recovering lower fatty acids, such as formic acid and acetic acid, from the oxidized products obtained by oxidizing in the liquid phase paraffinic hydrocarbons, naphthenic hydrocarbons or mixtures thereof, said hydrocarbons having boiling points lower than 200° C., with molecular oxygen or an oxygen-containing gas, with or without a catalyst. An improved process for carrying out the oxidation using a special class of catalysts is described in our copending application Ser. No. 349,178, filed Mar. 3, 1964, entitled Process for the Production of Lower Fatty Acids and assigned to the same assignee as the present application. The invention further relates to a novel and improved process for the recovery of the lower fatty acids from the oxidized products obtained by oxidizing a mixture of the feed hydrocarbons and "light fractions" and/or "high boiling-point residues," as will be defined below, recovered from the above liquid-phase oxidized products of the feed hydrocarbons.

The compositions of the oxidized products produced by the liquid-phase oxidation of paraffinic, naphthenic or paraffin-naphthenic hydrocarbons having boiling points lower than 200° C. with oxygen or an oxygen-containing gas, with or without a catalyst, can be generally divided into the following four classes of materials:

(a) Non-acidic materials distilled at temperatures lower than 99° C. with or without forming azeotropic mixtures with water (which materials are elsewhere referred to herein as "light fractions") and which mainly consist of aldehydes, esters, ketones, alcohols, unreacted oils and the like, (b) Water, (c) Lower fatty acids having 1–4 carbon atoms, and (d) Oxidates having boiling points higher than 170° C. (which materials are elsewhere referred to herein as "high boiling-points residues") and which consist of carboxylic acids, naphthenic acids, keto acids, hydroxy acids, higher alcohols, esters, carbonyl compounds, and dibasic acids such as succinic acid, glutaric acid and adipic acid and the like.

In the most cases, the oxidized products contain about 10–40% by weight of water. It is desired to recover formic acid at a concentration higher than 85% by weight but in general the content of water in the oxidized products is much larger than 15% by weight based on the weight of formic acid in the oxidized products.

In a conventional purification process, the oxidized products are first subjected to a distillation operation to remove the light fractions and then are subjected to a second distillation operation to remove the high boiling-point residues. By subjecting the thus obtained fraction consisting essentially of water and lower fatty acids having the 1–4 carbon atoms to a dehydrating distillation, formic acid-recovering distillation, acetic acid-recovering distillation, etc., successively, the lower fatty acids, such as formic acid and acetic acid, can be recovered. However, in the conventional procedures, it has been very difficult by the usual distillation processes to remove water from an aqueous formic acid solution or from a mixed system containing an aqueous formic acid solution and other lower fatty acids. The boiling point of formic acid is near to that of water (i.e., 100.8° C.), and formic acid forms an azeotropic mixture (having an azeotropic point of 107.2° C. and containing 22.6 wt. percent water) with water. Also, a ternary system of water, formic acid and acetic acid forms an azeotropic mixture. Hence, in order to obtain formic acid at a concentration higher than 85% by weight, an azeotropic distillation had to be carried out, using an entrainer or separating agent. As the entrainers for this purpose, many kinds of organic solvents consisting of a single component (e.g., isopropyl ether) or a mixed component (e.g., 2-butanone and cyclohexane) have been recommended. However, the amount of water carried by these entrainers is usually in the range of 5–15% and, hence, a very large amount of the entrainer, i.e., 7–20 times the amount of water distilled by the azeotropic distillation is required. Therefore, the distillation still must be a very large one, the process is very uneconomical in thermal efficiency and is disadvantageous for industrial applications.

The inventors have found, as the results of detailed studies of the entrainers to be used for the above-mentioned dehydration distillation, a novel entrainer for water having very excellent effects without having the aforementioned drawbacks of known entrainers and also capable of being used profitably for industrial purposes. The inventors have found that the light fractions, obtained from the oxidized products made by liquid phase oxidation of the above-mentioned hydrocarbons have very excellent properties as the entrainers of water in the dehydrating distillation of azeotropic mixtures of water and lower fatty acids having 1–4 carbon atoms.

As mentioned above, the light fractions are a complicated mixture containing mainly various aliphatic esters, ketones and alcohols besides a small amount of unreacted oils. Each of these components individually has either very little or no ability as an entrainer of water for azeotropic distillation, but if they are used as a mixture, the azeotropic effect on water is far larger than is the case with the above-mentioned known entrainers.

The present invention, therefore, relates to a process for recovering lower fatty acids, particularly for recovering formic acid at a concentration above 85% and other lower fatty acids, such as acetic acid, without the necessity of another subsequent dehydrating distillation process, by carrying out a dehydrating process using the light fractions as the entrainer of water.

Moreover, the inventors have found an unexpected fact, namely, that while the composition of the light fractions is somewhat influenced by the composition of feed oils, the kind of the oxidation catalysts used, and whether recycling of the light fractions and/or the high boiling-point residues is carried out in the reaction or not, the azeotropic effect of the light fractions as an entrainer of water is scarcely influenced by such variations. It has been clearly established by the inventors that there is contained in the light fractions a large amount of acetone. Therefore, if the acetone is recovered from the light fractions by a suitable means, the industrial value of the liquid-phase oxidation process of the above-mentioned hydrocarbons is increased. However, the light fractions from which the acetone fractions (having boiling points of 55–60° C.) have been removed (the light fractions from which the acetone fractions have been removed are denoted as "middle fractions" hereinafter) still have the desired effect of acting as an entrainer of water and their effect is not inferior to the effect of the original light fractions, and in fact is somewhat larger than the latter.

In any event, the use of the light fractions or the middle fractions as the entrainer for the dehydration distillation in accordance with this invention is very profitable since such fractions can be supplied very easily as they can be obtained from the oxidized products of the liquid-phase oxidation. Also, they can be re-used as the raw materials for the production of the lower fatty acids by recycling them into the reaction system after using them as the entrainer of water.

Moreover, as the light fractions and the middle fractions have very excellent azeotropic effects for water, that is, they can carry 20–50% by weight of water, it is sufficient if the amount of the fractions supplied to the dehydration distillation procedure as entrainers are 1–5 times the amount of water to be distilled out, whereas the recycling amount of known single component or binary component azeotropic solvents must be 7–20 times the amount of water to be distilled out. Therefore, the capacity of the distillation still can be reduced and the heat demand can be correspondingly reduced.

Another advantage obtained by the application of the process of this invention is that the acetone fraction-removing distillation and dehydrating distillation can be carried out by the same distillation column. In the conventional purification process, as mentioned before, at least one distillation column is required for each distillation. In accordance with the process of this invention, the aforementioned heat economy can be greatly increased and the purification process can be simplified as compared with the conventional processes.

According to the inventors' studies, aromatic acids having melting points above 100° C. are formed by the oxidation of aromatic hydrocarbons, such as toluene and xylene, if such hydrocarbons are present in the petroleum hydrocarbons used as the raw material for the oxidation. Also dibasic fatty acids having melting points higher than 100° C. are formed by the partial oxidation of paraffinic and naphthenic hydrocarbons. Such high boiling-point compounds are liable to precipitate in the oxidized products or in a process for removing the light fractions, which results in making subsequent distillating operations very difficult. Therefore, in the case where the crystals of the above-mentioned high boiling-point compounds are present in the oxidized products, in carrying out this invention, in order to facilitate the subsequent distillation for separating the light fraction and water, it is desirable to separate the high boiling-point compounds from the oxidation products by carrying out a distillation process for removing them.

For the practical application of this invention, for instance, the process mentioned below is recommended. The high boiling-point residues may be separated from the oxidized products obtained by the liquid-phase oxidation of the above-mentioned petroleum hydrocarbons by carrying out first flash distillation. From the flash distillate water and the light fractions may be separated from the fatty acids conaining 1–4 carbon atoms by an azeotropic distillation using the light fractions as an entrainer. For initiating the azeotropic distillation, a definite amount of the light fractions must, of course, be available and this can be prepared by another distillation procedure. However, once the azeotropic distillation procedure is in continuous operation, thereafter the light fractions are gradually accumulated during the distillation and they are recycled at least in part to the azeotropic distillation step. The accumulated light fractions, except the necessary amount for use as the entrainer, are removed from the distillation system and are recycled into the oxidation step.

The process of this invention can be similarly applied to oxidized products from which the acetone fractions and the high boiling-point residues have been removed by distillation. In this case, the middle fractions, i.e., the light fractions from which the acetone fractions have been removed, are used as an entrainer for water.

As mentioned above, the compositions of the oxidized products are influenced by the kinds of the feed hydrocarbons and the catalysts used and whether the light fractions and/or the high boiling-point residues are recycled to the reaction system or not. Explaining this in greater detail, the change of the compositions of the oxidized products caused by changes in the compositions of the feed hydrocarbons usually is comparatively small. However, if the light fractions and/or the high boiling-point residues are recycled into the reaction system, the concentrations of the light fractions, high boiling-point residues and water in the reaction products are increased about 10–30% each. Also, the ratio of the weights of the lower fatty acids produced, in particular, the ratio of acetic acid to formic acid, is greatly influenced by the kind of catalysts, viz, the aforesaid ratio of acetic acid to formic acid varies from 1 to 20 depending on the kind of catalyst used. Also, the total amount of the lower fatty acids formed is also influenced to some extent. However, by such variations, only the requisite capacities of the distillation columns used for removing the high boiling-point residues, light fractions and water and for purifying each lower fatty acid are affected. The azeotropic effect of the light fractions as the entrainer for water is not influenced very greatly. Moreover, instead of removing the high boiling-point residues from the oxidized products by distillation and then carrying out the distillation for removing the light fractions and water (such a process is denoted "process I" hereinafter), an alternative process can be practiced wherein the light fractions are first distilled off, the high boiling-point residues are removed then by distillation, and then a dehydrating distillation is carried out using as an entrainer the light fractions preferably recovered by distillation (the process is denoted "process II" hereinafter), with the same composition of the distillate being produced as when process I is followed.

However, in the case of process II, although a greater part of the light fractions is removed in the first distillation step for removing the light fractions, most of the water remains in the system. Consequently, the temperature at the top of the column is less by about 2–5° C. than is the case where the light fractions and water together are removed by distillation according to process I. Therefore, almost no light fractions are present in the raw materials to be subjected to the subsequent distillation for removing the high boiling-point residues. Hence, the distilling temperature for removing the high boiling-point residues by distillation can be increased by about 2–7° C. than is the case where the high boiling-point residues are removed by distillation directly from the oxidized products. However, as the light fractions are used as an entrainer for water in the dehydrating distillation in process II, the conditions for the azeotropic distillation in process II are completely the same as the conditions for the azeotropic distillation in the distillation process for removing the light fractions and water according to process I.

Further, as other suitable processes for carrying out this invention, there can be used a process in which the acetone fractions are removed from the oxidized products from which the high boiling-point residues previously have been removed by distillation and then a distillation for removing the middle fractions and water is carried out (process III). There can also be used a process in which the high boiling-point residues are removed from the oxidized products from which the acetone fractions previously have been removed by distillation and then a distillation is carried out for removing the middle fractions and water (process IV). The conditions for distilling off the acetone fractions in process III are the same as those in process IV except only that the liquid temperature in the distilling column in process III is 4–10° C. higher than that in process IV. There are no differences between these two processes insofar as the conditions for the distillation for removing the high boiling-point residues are concerned except only that this latter distilling temperature in process IV is 2–4° C. higher than that in process III. Moreover, the middle fraction removing distillation and the dehydrating distillation can be carried out under almost the same conditions both in process III and in process IV.

In the case of process III and process IV, the non-acidic oxidate obtained from the acetone fractions after removing acetone by extractive distillation may be recycled into the reaction system and, therefore, it is unnecessary to recycle said oxidate into the entrainer for distilling off the middle fractions and water. In all of the above processes I–IV, the reaction products from which the high boiling-point residues, water and light fractions have been removed by distillation consist of various lower fatty acids having 1–4 carbon atoms. Each lower fatty acid can be recovered in a pure state from the mixture by distillation successively in the order of the carbon number of their molecule. That is, formic acid can be separated from a mixed solution of the lower fatty acids by a known azeotropic distillation using benzene, toluene, or ethylene dichloride as the entrainer, and acetic acid, propionic acid, and butyric acid can be separated successively by conventional distillations from the still residue of the azeotropic distillation.

The process of this invention will be explained in greater detail with reference to the following examples and also referring to the accompanying drawing which schematically shows a system suitable for carrying out the process of this invention.

EXAMPLE 1

Straight-run gasoline consisting of 44.9% naphthenic hydrocarbons having boiling points of 38–130° C., 44.9% paraffinic hydrocarbons and 7.2% aromatic hydrocarbons was subjected to a continuous liquid-phase oxidation in the presence of a manganese naphthenate catalyst (in an amount of 0.1 wt. percent metallic manganese based on the weight of the feed oils) at temperatures of 145–165° C. and a reaction pressure of 60 atm. and oxidized products having the following composition were obtained:

| | Wt. percent |
|---|---|
| Water | 18.0 |
| Light fractions | 13.5 |
| High boiling-point residues | 16.2 |
| Formic acid | 18.5 |
| Acetic acid | 27.7 |
| Fatty acids having more than three carbon atoms | 3.3 |
| Crystalline materials having M.P. higher than 100° C. | 2.8 |
| Total | 100.0 |

Continuous distillations were carried out on the oxidized products for removing the high boiling-point fractions and the light fractions and water in accordance with the process of this invention by using the apparatus as shown in the accompanying drawing.

The oxidized products were preheated to 140–160° C. in conduit 1 and then were introduced into a flash column 2 having twelve plates. The products were distilled under the following conditions: column-top temperatures of 101–102° C., liquid-in-still temperatures of 200–210° C. and a reflux ratio of 1. A still-residue containing all of the crystalline materials and about 5 wt. percent of the fatty acids having 1–4 carbon atoms together with water was withdrawn from a conduit 3. The distillate of this column which mainly consisted of water, the light fractions and the fatty acids having 1–4 carbon atoms, was introduced into a dehydrating column 5 through a conduit 4. The column 5 was a bubble cap column having sixty plates and operated with a column-top temperature of 80–82° C. and a liquid-in-still temperature of 115–118° C. The distillate was cooled in a conduit 6 and was separated into an oily layer and an aqueous layer in a separator 7. Portions of the light-oil layer and the aqueous layer separated in the separator 7 were returned back into the top of column 5 through a conduit 9. The reflux ratio of the aqueous layer in the column 5 was 2 and the reflux rate of the light fractions was 1.5 times higher than that of the aqueous layer. The remainder of the oily layer of light fraction was returned back into the reaction system and used as the raw materials. The remainder of the aqueous layer obtained from the separator 7 was sent to a distillator 8 for recovering non-acidic materials, and recovered non-acidic materials were then returned into the separator 7. The still-residue of the dehydrating column 5 was introduced into a column 11 through a conduit 10. Formic acid was distilled using benzene as the entrainer and from the lower layer of thus obtained distillate formic acid of 92% concentration was recovered. The still-residue of the column 11 was then introduced into a fractionating column for acetic acid. The purity of acetic acid thus obtained was above 99.5%.

EXAMPLE 2

Straight-run gasoline having the same composition as in Example 1 was subjected to a continuous liquid-phase oxidation in the presence of cobalt naphthenate and nickel naphthenate catalysts at the reaction temperatures of 170–180° C., and a reaction pressure of 50 atm. and an oxidized product containing 19 wt. percent water, 3.6 wt. percent formic acid, 39.2 wt. percent acetic acid, etc., was obtained. The oxidized product was, as in Example 1, subjected to a flash distillation and then dehydrating distillation by using the bubble cap column having sixty plates. The dehydrating distillation was carried out under the conditions that the column-top temperature was 82–85° C., the liquid-in-still temperature was 118–120° C., the reflux ratio for the aqueous layer was 3, and the reflux ratio for the light fractions was 1.8 times larger than the reflux ratio for the aqueous layer. The water and the light fractions were removed and sent to the separator and a still-residue containing 0.2% water was obtained. This still-residue was subjected to the distillation in column 11 for removing formic acid using ethylene dichloride as an entrainer. Since the specific gravity of ethylene dichloride is larger than that of formic acid, formic acid forms the upper layer of the distillate. From this upper layer formic acid of 95% in concentration was recovered by removing dissolved ethylene dichloride. From the still residue of the formic acid distillation column 11, acetic acid of 99.5% in purity was recovered by successive distillation.

EXAMPLE 3

The hydrocarbons stated in Example 1 and the "high boiling-point residue" recovered from the process according to Example 2 were mixed and oxidized in the liquid phase under the same reaction conditions as in Example 2. An oxidized product containing 21 wt. percent water, 3.2 wt. percent formic acid, 25.5 wt. percent acetic acid, and 24.2 wt. percent high boiling-point fractions was obtained from which formic acid of 94% concentration and acetic acid of 99.6% purity were recovered by distillation as in Example 2.

EXAMPLE 4

The fractions having boiling points of 50–110° C. (consisting of 96% paraffinic hydrocarbons, 2.5% naphthenic hydrocarbons and 0.5% aromatic hydrocarbons) obtained from a Middle East petroleum by distillation, the middle fraction and the high boiling-point residues recovered from the oxidized product as described hereinbelow were used as the raw material for the oxidation and they were subjected to a continuous liquid-phase oxidation under the reaction conditions of: reaction temperature of 155–165° C. and reaction pressure of 40 atm. The thus obtained oxidized product contained 18 wt. percent water. The oxidized product was first distilled to remove acetone by using a distilling column having forty plates under conditions such that the column-top temperature was 53–55° C., the liquid-in-still temperature was 110–115° C. and the reflux ratio was 8. The mixture from which the acetone had been removed was subjected to a flash distillation as in Example 1 to remove high boiling-point residues. The distillate (consisting of 10–15% of middle fractions, 25–30% of water and the rest lower fatty acids) obtained from the flash distillation was introduced into a dehydrating column wherein the dehydrating distillation was carried out using the middle fraction as an entrainer. As the dehydrating column a packed column having 38 theoretical plate numbers was used and the dehydration was carried out under such conditions that the column-top temperature was 86–88° C., liquid-in-still temperature was 116–118° C., the aqueous layer reflux ratio was 4, and the reflux rate of the oily layer of the middle fraction was 2.5 times larger than the reflux rate of the aqueous layer. The still-residue of the dehydrating column contained 0.2% water and it was distilled to recover formic acid using ethylene dichloride as an entrainer and then thus obtained formic acid was purified by subjecting it to a process for removing dissolved ethylene dichloride. By this process formic acid of 98.5% concentration was obtained. From the residue after recovering formic acid, acetic acid of 99.6% purity was obtained by a successive distillation.

While the invention has been described with reference to specific examples as described above, the invention is not limited to the details of these examples but, rather, includes such modifications or changes therein as be within the scope of the appended claims.

What is claimed is:

1. In a process for the formation and recovery of lower fatty acids which includes the steps of oxidizing feed hydrocarbons selected from the group consisting of paraffinic hydrocarbons, naphthenic hydrocarbons and paraffinic-naphthenic hydrocarbons, said hydrocarbons having boiling points lower than 200° C., in the liquid state with an oxidizing agent selected from the group consisting of molecular oxygen and an oxygen-containing gas to form an oxidized product consisting of (a) a light fraction consisting of nonacidic materials that can be distilled out at temperatures lower than 99° C., (b) water, (c) lower fatty acids having 1 to 4 carbon atoms, and (d) a high boiling-point residue consisting of oxidates having boiling points higher than 170° C.; and then removing the high boiling point residue, the light fraction and water from the oxidized product by distillation in order to recover the lower fatty acids, the improvement for removing water from the lower fatty acids so that the lower fatty acids are recovered in a concentrated condition, which improvement comprises the steps of feeding into a distilling device oxidized product free of high boiling point residue and comprising water and lower fatty acids, and feeding into said distilling device separately from said oxidized product a quantity of said light fraction in such an amount that substantially all of the water in he oxidized product in said distilling device forms an azeotrope with said light fraction, distilling out of said distilling device vapors of said azeotrope and recovering from the base of said distilling device lower fatty acids in a concentrated condition substantially free of water and light fraction.

2. A process as claimed in claim 1, wherein the light fraction is removed first from the oxidized product by distillation, then the high boiling point residue is removed from the oxidized product by distillation, then the remainder of said oxidized product is fed into said distilling device, and a portion of said previously removed light fraction is fed into said distilling device to form said azeotrope.

3. A process as claimed in claim 1, wherein said light fraction and said high boiling point residue are removed from said oxidized product before said oxidized product is fed into said distilling device, and including the step of removing from said light fraction by distillation materials having boiling points lower than about 60° C., and then feeding a portion of the remainder of said light fraction into said distilling device to form said azeotrope.

4. A process as claimed in claim 1, wherein the light fraction is supplied to said distilling device separately from the oxidized product in an amount of 1–5 times the amount of water to be distilled out.

5. A process as claimed in claim 3, wherein the remainder of said light fraction is supplied to the distilling device separately from the oxidized product in an amount of 1–5 times the amount of water to be distilled out.

6. A process as claimed in claim 1, wherein the oxidized product fed into said distilling device also includes the light fraction and including the step of returning light fraction condensed from the vapors distilled from said distilling device to said distilling device as reflux.

References Cited

UNITED STATES PATENTS 3,337,619   8/1967   Bowe et al. _____ 260—533

LORRAINE A. WEINBERGER, Primary Examiner

D. E. STENZEL, Assistant Examiner